United States Patent [19]
Henderson et al.

[11] 3,748,095
[45] July 24, 1973

[54] PRODUCTION OF HIGH PURITY RARE EARTH SULFIDES
[75] Inventors: James R. Henderson, Los Angeles; Donald M. Johnson, Malibu; Michiya Muramoto, Santa Monica, all of Calif.
[73] Assignee: McDonnell Douglas Corporation, Santa Monica, Calif.
[22] Filed: June 17, 1968
[21] Appl. No.: 737,770

[52] U.S. Cl. .................... 423/21, 423/254, 423/252, 423/3, 423/562
[51] Int. Cl. ...................... C22b 59/00, C01f 17/00
[58] Field of Search ................. 23/50, 53, 134, 204, 23/21, 316, 347, 345, 206

[56] References Cited
UNITED STATES PATENTS

| | | | |
|---|---|---|---|
| 3,282,656 | 11/1966 | Kruger et al. | 23/347 |
| 3,334,974 | 8/1967 | Fletcher et al. | 23/345 |
| 2,980,500 | 4/1961 | Miller | 23/134 X |
| 3,033,659 | 5/1962 | Fischer | 23/134 X |
| 3,065,515 | 11/1962 | Antes | 23/134 X |
| 3,253,886 | 5/1966 | Lamprey et al. | 23/134 |

FOREIGN PATENTS OR APPLICATIONS
158,267    1/1964    U.S.S.R. .................................. 23/21

OTHER PUBLICATIONS

Eastman et al., "Journal of the American Chemical Society," Vol. 72, 1,950, pp. 2248-2250.

Samsonov, "High-Temperature Compounds of Rare Earth Metals with Nonmetals," Consultants Bureau, New York, 1965, pp. 252-259.

Primary Examiner—Carl D. Quarforth
Assistant Examiner—F. M. Gittes
Attorney—Max Geldin

[57] ABSTRACT

Novel method for the production of high purity metal sulfides, selenides, tellurides, and arsenides, particularly those of high melting point greater than 1,000° C, e.g., such compounds of the rare earth metals. An anhydrous metal, metal salt, metal oxide or mixtures thereof is contacted with a gas mixture, e.g., $H_2S$ and $CS_2$ at a high temperature, e.g., in the range of about 1,250° C to about 1,325° C, in the substantial absence of water vapor and oxygen until the product has been formed. The metal sulfides, tellurides, selenides, and arsenides thus produced are formed into single crystals which are useful as semi-conductors, transistors, etc.

9 Claims, 3 Drawing Figures

JAMES R. HENDERSON
DONALD M. JOHNSON
MICHIYA MURAMOTO
INVENTORS

BY Mark Gilden

ATTORNEY

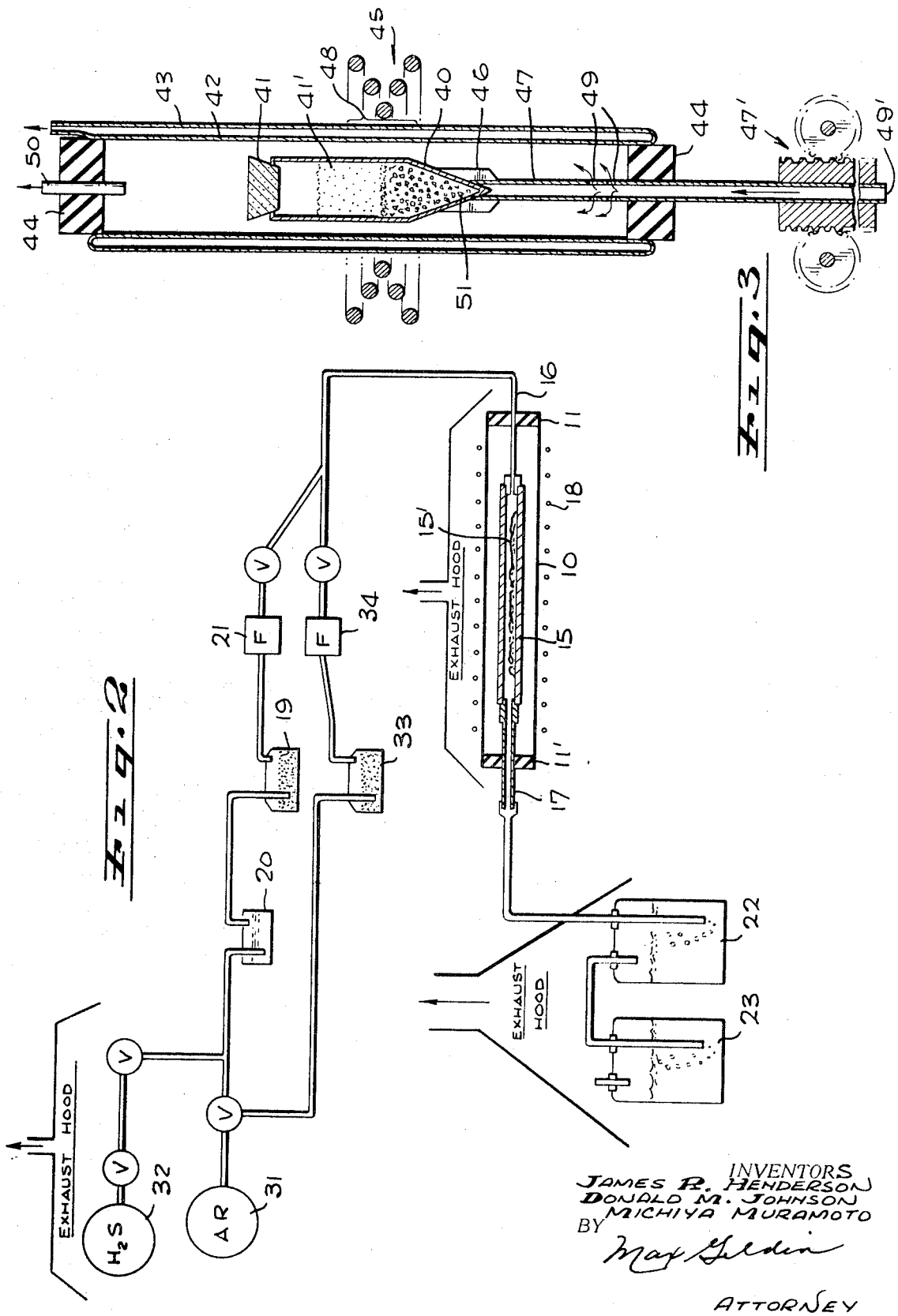

PRODUCTION OF HIGH PURITY RARE EARTH SULFIDES

This invention relates to production of high purity metal sulfides, selenides, tellurides, and arsenides and the single crystals thereof, particularly the sulfides, selenides, tellurides and arsenides of the rare earth metals and the single crystals thereof.

In recent years there has been considerable interest in semi-conductive materials having relatively high melting temperatures which would permit operation of electronic devices beyond the melting temperatures of today's most widely used semi-conductors. Rare earth semi-conductive materials, particularly the sulfides, selenides, and tellurides showed great promise because of their high melting points. However, repeated attempts to produce these materials in pure form resulted in failure. The impure materials produced exhibited a lack of constant electrical resistivity with a change in temperature especially in the hoped for high temperature range. Moreover, the processes required extensive and costly preparation methods. It was also found that the impurity of these materials prevented their being formed into single crystals. As a consequence, the rare earth semi-conductive materials have found limited commercial application.

Until the present time, rare earth metal sulfides, selenides, tellurides and arsenides have been produced by several methods. These methods will be discussed with reference to the sulfides, but it should be kept in mind that the selenides, tellurides, and arsenides are similarly produced.

The first of these methods involves the reaction of anhydrous metal salts such as the chloride or sulfate with $H_2S$ at about 1,000°C. A major disadvantage of this process is that it is expensive since an elaborate preparation and quality control of the anhydrous metal salt raw material is required. Also, all water vapor must be completely removed from the reaction chamber since reaction products, e.g., HCl in the case of the chloride, will dissolve the metal sulfide product in the presence of water. Even with all these precautions, the reaction never goes to 100 percent completion and the product is contaminated with oxysulfide and oxychloride impurities. (See U.S. Pat. No. 2,978,661)

Another method involves the reaction of a metal oxide with $H_2S$ at 1250°–1300°C in a graphite furnace. This method also requires a long reaction time and even then may never reach completion. Furthermore, the furnace walls are destructively corroded by the $H_2S$ and the particles of corroded furnace wall contaminate the product and limit production to a few cycles for a set-up of expensive equipment. The graphite particles, moreover, are impossible to remove and remain as an impurity. (See Picon and Cogné, Bulletin de la Societe de Chimie, Paper, France No. 51, 1932, page 94; Mile. M. Guittard, These de Doctorate en Pharmacie, Paris, France, 1957; Jean Flahaut, Micheline Guittard and Madelene Patrie. Bulletin de la Societe de Chimie, France, Paper No. 180, 1958, page 990; M. Picon, L. Domage, J. Flahaut, M. Guittard, and M. Patrie, Bulletin de la Societe de Chemie, France, Paper No. 2, 1960, page 221; V. I. Marchenko and G. V. Samsonov, Neorganicheskie Materialy, Vol. 1, No. 1., 1965, pages 47–52; E. Eastman, L. Brewer, L. Bromley, P. Gilles, and N. Lofgren, Journal of the American Chemical Society, Vol. 72, 1950, page 2248.)

A third method is the direct reaction of the elemental metal with sulfur at 1,000°C. This process is potentially explosive and is considerably more expensive than the two methods previously described. The purity of the product is limited by the purity of the starting materials, and the metals, especially in the case of the rare earth metals are too expensive to permit practical production. (See U.S. Pat. No. 2,978,661 and "Rare Earth Compound Semi-conductors" J. F. Miller, F. J. Reid, and R. C. Himes, J. Electro Chem. Soc. 106,1043 (1959); and also U.S. Pat. No. 3,174,939).

A final method involves the reaction of the metal oxide with carbon disulfide heated to 1,100°C. The disadvantages of this method are that the product is contaminated with oxycarbides and metal carbide impurities. (See L. Ya. Markovskii, E. Ya. Pesina and R. I. Smirnova, Zh. Prik. Khim, Fol. 28, 1956, page 441.); and also U.S.S.R. 158,267.

It has now surprisingly been found that pure sulfides, tellurides, selenides and arsenides can be produced by a simple, inexpensive process according to the invention, in such high purity that single crystals of the rare earth metal compounds are easily drawn from a melt of these compounds. The single crystals have extensive use as semi-conductors, photon sensors and narrow band photon counters, transistors and thermal radiation detectors, and injection lasers.

The process of the invention while particularly suited for the production of the sulfides, selenides, tellurides, and arsenides of the rare earth metals, considered to include elements 39 and 57–71 of the periodic table, has wide application in the production of the sulfides, selenides, tellurides, and arsenides of any metals wherein such compounds have a melting point of about 900°C or greater. As used herein and in the appended claims, the term "metal" is meant to include any element of the periodic table that in general is characterized chemically by the ability to form cations by loss of one or more electrons from each atom to form basic oxides and hydroxides.

The process of the invention broadly comprises contacting a substance selected from the group consisting of substantially anhydrous metal, metal oxide, metal salt, and mixtures thereof, with (a) a first substantially dry gas selected from the group consisting of $H_2$ and $H_2Z$, and with (b) a second substantially dry gas selected from the group consisting of $CZ_2$ and organic compounds of Z, wherein Z is selected from the group consisting of S, Se, Te, and As, said reaction being conducted at a temperature in the range of from about 900°C to about 1,500°C, and in the substantial absence of oxygen and water vapor, for a time sufficient to allow substantially complete reaction.

The method of the invention particularly comprises contacting a substantially anhydrous metal, metal salt, metal oxide or a mixture thereof with a mixture of dry gases selected from the group consisting of (a) one of $H_2$ and $H_2Z$ and (b) one of $CZ_2$ and organic compounds of Z, wherein Z is selected from the group consisting of sulfur, selenium, tellurium, and arsenic. The gas mixture can have varying proportions of the (a) and (b) components above, as more fully described below. The reaction is conducted at a preferably uniform, high temperature in the range of from about 900°C to about 1,500°C, preferably from about 1,100°C to about 1,350°C, and substantially in the absence of oxygen and water vapor. Reaction time is sufficient to allow substantially complete reaction to occur and is usually about 1 hour per 50–100 grams of starting material. At the end of the reaction, the product in the form of a powder is cooled to room temperature. Single crystals can be formed from a melt of this powder.

The invention provides rare earth sulfides, tellurides, selenides, and arsenides of such great purity that they are readily formed into single crystals. Until the discovery of the process of the invention, such single crystals were difficult or impossible to form. When used as injection lasers, these crystals may provide high power output in frequency ranges heretofore unattainable, and high temperature operation is possible. If used as photon detectors or counters, the single crystals may provide low noise, high efficiency, extended lifetime at ambient and higher temperatures. As transistors, the single crystals of the invention could exhibit high efficiency, and long operating life at high temperature.

A method whereby off-the-shelf reagents can be used without further purification or pulverizing is provided by the invention. In particular, by using in the process metal oxides, which are cheaply available in high purity even for the rare earth metals, the cost of the process is greatly reduced in comparison with the cost of previous methods.

The invention also provides an efficient method for producing the sulfides, selenides, tellurides, and arsenides of the rare earth metals, which goes substantially to 100 percent completion without corrosion of furnace materials or product contamination. Furthermore, the process is one-cycle and is faster than previous methods. The efficiency and short reaction time provide significant cost savings making the process of the invention practical and thus attractive for production on a commercial scale not only of the rare earth metal compounds but of compounds of the other metals, particularly high melting metal sulfides, tellurides, selenides and arsenides, having a melting point greater than about 900°C.

Illustrative examples of metal sulfides, including rare earth metals sulfides having high melting temperatures which can be produced by the process of the invention are shown in Table I below, together with the melting point where known. The invention, however, is not limited to these specific compounds.

TABLE I

| Materials | Melting Point° C |
|---|---|
| Actinium sulfide $Ac_2S_3$ | |
| Aluminum sulfide $Al_2S_3$ | 1100 |
| Barium sulfide BaS | 1200 |
| Beryllium sulfide BeS | |
| Cadmium sulfide CdS | sublimes at 980 |
| *Cerium sulfide $CeS_2$ | >2000 |
| Chromium sulfide $Cr_2S_3$ | 1350 |
| Cobalt sulfide CoS | >1116 |
| Copper sulfide $Cu_2S$ | 1100 |
| *Dysprosium sulfide $Dy_2S_3$ | ~1500 |
| *Erbium sulfide $Er_2S_3$ | 1730 |
| *Europium sulfide EuS or $Eu_2S_3$ | >1500 |
| *Gadolinium sulfide $Gd_2S_3$ | 1885 |
| Gallium sulfide $Ga_2S_3$ | 1255 |
| Hafnium sulfide $HfS_2$ | |
| *Holmium sulfide $Ho_2S_3$ | >1500 |
| Indium sulfide $In_2S_3$ | 1050 |
| *Lanthanum sulfide $La_2S_3$ | 2080 |
| Lead sulfide PbS | 1114 |
| Lithium sulfide $Li_2S$ | 900–975 |
| *Lutetium sulfide $Lu_2S_3$ | >1500 |
| Magnesium sulfide MgS | decomposes at >2000 |
| Molybdenum sulfide $Mo_2S_3$ | decomposes at >1100 |
| *Neodymium sulfide $Nd_2S_3$ | 2010 |
| Niobium sulfide $Nb_2S_3$ | |
| Praesodymium sulfide $Pr_2S_3$ | 1795 |
| Radium sulfide RaS | |
| Ruthenium sulfide $RuS_2$ | decomposes at 1000 |
| *Samarium sulfide $Sm_2S_3$ | 1780 |
| Scandium sulfide $Sc_2S_3$ | |
| Silicon sulfide SiS | sublimes at 940 |
| Sodium sulfide $Na_2S$ | 1180 |
| Strontium sulfide SrS | >2000 |
| Tantalum sulfide $TaS_2$ | >1300 |
| *Terbium sulfide $Tb_2S_3$ | >1500 |
| Thorium sulfide $ThS_2$ | 1925 |
| *Thulium sulfide $Tm_2S_3$ | >1500 |
| Titanium sulfide $Ti_2S_3$ | |
| Tungsten sulfide $WS_2$ | decomposes at 1250 |
| Uranium sulfide $US_2$ | >1100 |
| *Ytterbium sulfide $Yb_2S_3$ | >1500 |
| *Yttrium sulfide $Y_2S_3$ | >1500 |
| Zinc sulfide ZnS | sublimes at 1185 |
| Zirconium sulfide ZrS | 1550 |

*rare earth metal sulfides

Starting materials for the process of the invention include the pure metal, metal oxide, metal salt and mixtures thereof. Preferred materials include the oxide, or organic or inorganic metal salts. Of these, the oxide is more preferred because assuming that the cost per pound of the metal oxide and the metal salt are the same, there is more action available in the oxide than in the same weight of the salt. Furthermore, the oxide is more readily available at lower cost especially for the rare earth metals of 39 and 57 through 71 of the periodic table, including Y, La, Ce, Pr, Nd, Pm, Sm, Eu, Gd, Tb, Dy, Ho, Er, Tm, Yb and Lu. The invention process is particularly advantageous employing an oxide of one of the rare earth metals Nd, Sm, Gd, Dy and Y. Examples of metal salts which are readily available include among others the metal halides, sulfates, nitrates, carbonates, acetates, etc. Under certain conditions the pure metal might be desirable as the metal reactant. In general, however, such use, while feasible, is not recommended since the metals are difficult to purify and are expensive. Furthermore, the metal does not have as large a surface area as the oxide or salt. Finally, the metals are chemically less stable than the metal oxides or salts and consequently tend to be violently reactive.

It is important that the metal, metal oxide, or metal salt be substantially anhydrous. Anhydrous metal oxides and salts are available commercially and no further purification or treatment is usually necessary before use. Any water of hydration which might be present in the oxide or salt is removed in the course of the reaction as later explained.

The other reactant is in the form of a mixture of gases selected from the group consisting of (a) one of $H_2$ and $H_2Z$ and (b) one of $CZ_2$ and organic compounds of Z, wherein Z is selected from the group consisting of sulfur, selenium, tellurium, and arsenic. Organic compounds of Z include, for example, alkyl sulfides, selenides, tellurides and arsenides. Thus, for example, the gas mixture can comprise but is not limited to $H_2S$ and $CS_2$, $H_2Se$ and $CSe_2$, $H_2Te$ and $CTe_2$, $H_2As$ and $CAs_2$, $H_2$ and $CS_2$, $H_2$ and $CAs_2$, $H_2S$ and $(CH_3)_2S$, $H_2Se$ and $(C_2H_5)_2Se$, $H_2$ and $(CH_3)_2 Te$.

The gas mixture is ideally in stoichiometric proportion but can range from about 10 percent to about 98 percent of (a), e.g., $H_2S$, and from about 90 percent to about 2 percent of (b), e.g., $CS_2$, and preferably from about 50 percent to about 98 percent of (a) and from about 50 percent to about 2 percent of (b). A preferred way of effecting the gas mixture includes bubbling (a) into the liquid form of (b) especially when $H_2S$ and $CS_2$ comprise the gas mixture. When the latter method is used, the gas mixture normally comprises from about 90 percent to about 98 percent of (a) and from about 10 percent to about 2 percent of (b).

Using $H_2S$ and $CS_2$ as an example, it is believed that under the conditions of the reaction these two gases function synergistically, because they both decompose to furnish sulfur to the metal reactant, and other breakdown components of these respective reactants, $H_2$ and C, are believed to react with such sulfur in proximity to the metal reactant to maintain sufficient $CS_2$ to drive the sulfide synthesis to completion. Thus:

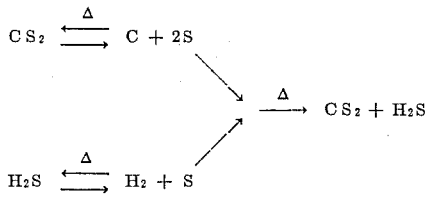

The $CS_2$ and $H_2S$ are believed to react with the metal reactant, a metal oxide $Me_2O_3$ in the example below, in the following manner

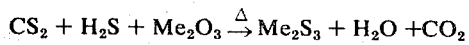

It is important that the gas mixture be substantially dry, that is, substantially free of traces of moisture which would interfere with the reaction. Any moisture initially present in the gas mixture can be easily removed by passage of the gas mixture through an inert drying agent such as phosphorus pentoxide which does not react chemically with the gas mixture, but reacts with the moisture to form orthophosphoric acid.

Absolute purity of the components of the gas mixture is not necessary and commercially available reagents are suitable.

Since the gas mixture is composed of toxic components, it is convenient to safely remove the discharge gases by flowing them into a chemical absorber, such as a saturated NaOH solution. Using as an example $H_2S$ and $CS_2$ as the gas reaction mixture, the following compounds are formed when passed through NaOH solution:

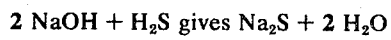

sodium xanthate

Similar reactions occur with corresponding Se, Te, and As gas mixtures.

A substantial excess of the gas mixture is employed over that required to react with the metal reactant. Thus, a sufficient amount of the gas mixture is preferably supplied to the metal reactant so that at least about 100 moles (STP) of the gas mixture flows over each mole of the metal reactant calculated as available cation present. Greater amounts of gas mixture than would be calculated to react with the available metal cation are required, since a portion of the gas mixture passes over the metal reactant without reacting with it.

In order to attain the most efficient reaction, the gas mixture is preferably placed in a flow-stream system in order to remove by-product vapors, e.g., $H_2O$ and $CO_2$, down-stream from the accumulating product. If allowed to remain in the reaction chamber, $H_2O$ and $CO_2$ will react, for example, with some of the metal sulfide product to form oxycarbide and oxysulfide impurities. Similar product contamination takes place in the production of the metal tellurides, selenides, and arsenides in the presence of by-product vapors.

Reaction temperature will depend on the identity of the particular metal reactant. In the case where metal sulfides, selenides, tellurides and arsenides having melting points lower than about 1,250°C, e.g., down to about 900°C, are to be produced, the ideal reaction temperature or temperature range can be determined by experiment with each species of reactant.

For such metal compounds including the rare earth metal compounds having melting points greater than about 1,250°C, reaction temperature should be within the range of about 1,250°C to about 1,325°C, and preferably for most cases between about 1,250°C and about 1,300°C. For the production of such materials, when temperatures drop below about 1,250°C oxysulfide, oxytelluride, oxyselenide, and oxyarsenide contaminants are formed. When temperatures go higher than about 1,325°C, it is found that "glazing," or reduction of the product occurs with diminution of powder surface area and a consequent retention of oxysulfide, oxytelluride, oxyselenide, or oxyarsenide core.

The reaction should be conducted in the substantial absence of oxygen or air since these might react with the gas mixture to form a flammable or explosive mixture and also cause oxidation of the product. Also, moisture should be excluded to avoid reduction of the rate of reaction.

At the reaction temperature, billowy vapors of steam and sulfur, selenium, tellurium or arsenic blow downstream during a portion of the reaction and diminish in quantity as the reaction reaches completion. Near the end of an hour at reaction temperature such billowy vapors are no longer seen, and are an indication that reaction is at or near completion.

The end of the reaction is determined empirically by observing the overall uniform color of the removed synthesized powder and making an acid test on the powder for insoluble materials such as oxysulfides, oxytellurides, oxyselenides, and oxyarsenides. This latter test is made by taking a small sample of the synthesized powder, for example, a metal sulfide, and dissolving it in 50 percent HCl on a cover glass. The quality of sulfide crystallites can be observed under a microscope having a 30-power magnification. Quality crystallites, e.g., those containing no oxy-impurities, for example of sulfur, or impurities of graphite flakes, dissolve in 50 percent HCl with a noticeably even vigor, giving off rapid bubbles of $H_2S$. These crystallites, when diminishing in size, become transparent, and are quite similar in appearance to pure water crystals dissolving in warm water. Impure sulfide crystals show an uneven rate of dissolution and a translucent appearance. Minute particles of graphite from the dissolution "glisten" on the acid solution. Sulfur impurity floats to the surface forming an amorphous film, while the oxy- impurities, for example oxysulfide drops to the bottom of the acid solution.

In general, an overall reaction time of about 1 hour is usually sufficient to convert 100 grams of starting metal oxide to the corresponding metal sulfide, telluride, selenide or arsenide.

Upon completion of the reaction, it is preferred to flow an inert gas such as argon over the synthesized product to remove traces of the gas mixture reactant, and the product is then preferably cooled to about ambient temperature. Subsequent treatment with an inert solvent for sulfur, tellurium, selenium or arsenic removes these occluded materials from the powder product to produce an extremely pure product. Carbon tetrachloride is preferred for removing occluded sulfur, carbon disulfide for occluded tellurium, chloroform for occluded selenium, and carbon disulfide for occluded arsenic.

While many furnace designs are suitable for the process of the invention, it has been found that excellent results can be obtained with a furnace shape which is tubular.

The invention will be further described in connection with the accompanying drawings wherein:

FIG. 2 illustrates a reagent flow scheme for the invention process used in conjunction with the furnace of FIG. 1; and FIG. 3 illustrates a crystal growth apparatus for producing single crystals of the products produced in accordance with the invention.

Figure 1:
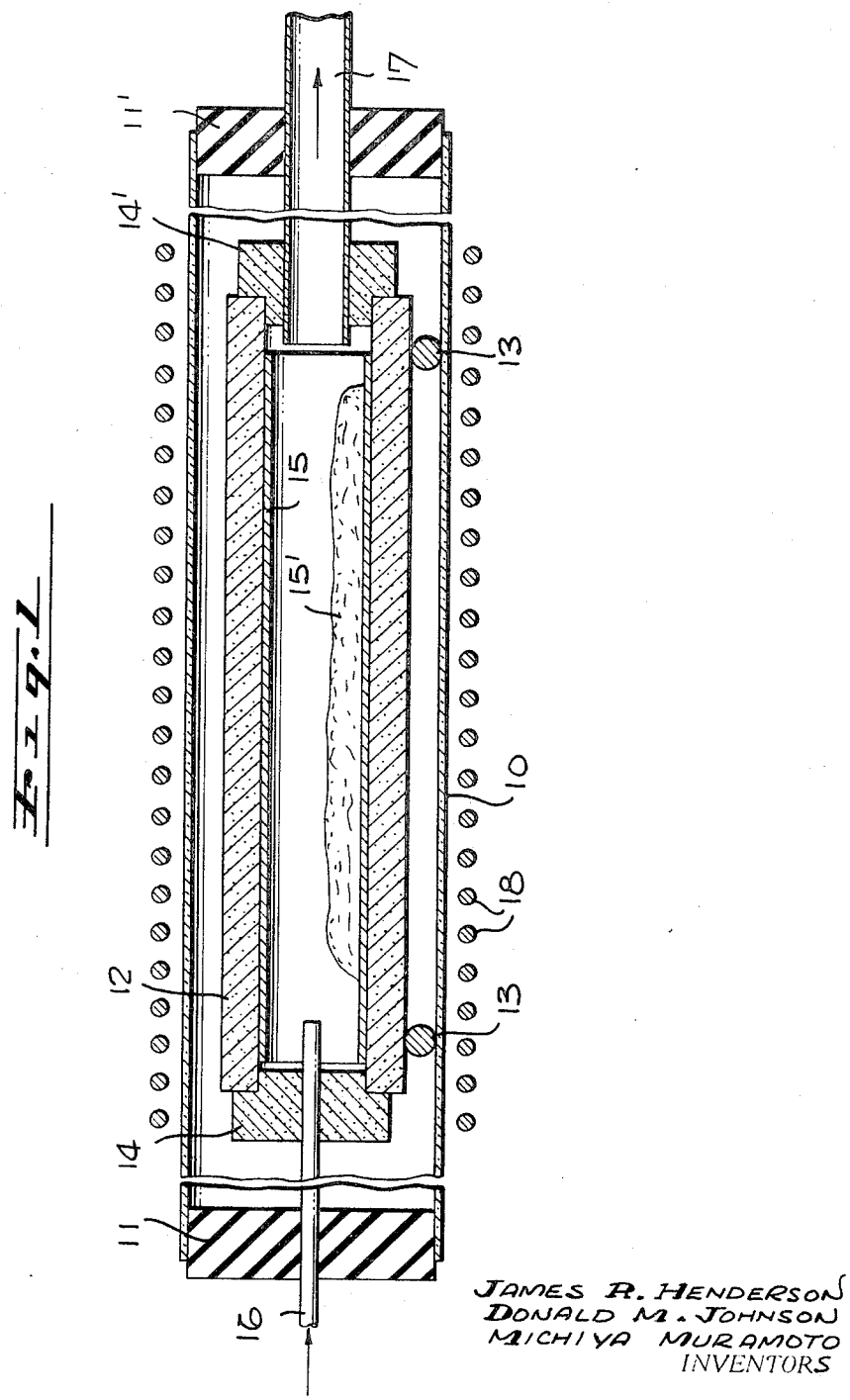
FIG. 1 illustrates a furnace design suitable for use in the invention process.

Referring to the furnace design illustrated in FIG. 1, as shown in the diagram, the overall design of the furnace is tubular with the outer walls being formed of a quartz tube 10, e.g., of 4-feet length having 2½ inch outer diameter and walls of 3 mm. thickness. The open ends of the quartz tube 10 are sealed with neoprene stoppers 11 and 11', having central openings therein. An artificial graphite tube 12, e.g., having a 2 inch outer diameter and a 16 inch length and ¼ inch wall thickness, is positioned within the quartz tube 10 and supported by alumina feet 13. The ends of the artificial graphite tube 12 have closures 14 and 14' of artificial graphite with central openings. Within the artificial graphite tube 12 is a pyrolytic graphite liner 15, e.g., of 1¼ inch tubing, 10 inches in length and having a 3-mm. wall thickness, which forms the reaction chamber containing the metal oxide or equivalent material at 15'. An alumina tube 16 of high purity AP35, a dense ceramic, is positioned at the upstream end of the quartz tube 10 in the central openings of the neoprene stopper 11 and artificial graphite closure 14 to provide a closed passage between the outside of the quartz tube 10 to the pyrolytic graphite liner 15 reaction chamber for purposes of reagent intake. The outer diameter of the tube 16 is e.g., three-eighths inch with an inner diameter of one-fourth inch and a total length of 16 inches. Another alumina tube 17 of AP35 is also positioned in the down-stream end of the quartz tube 10 in the central openings of the neoprene stopper 11' and artificial graphite closure 14' to provide a closed passage between the reaction chamber and the outside of the quartz tube 10 for purposes of by-product outlet. The alumina tube 17 has an outer diameter, e.g., of 1¼ inch and an inner diameter of 1 inch and a length of 16 inches. Surrounding the quartz tube 10 is a load coil 18, e.g., made of one-fourth inch outer diameter copper tubing which has been partially flattened in a vise.

It can be seen from FIG. 1 that the tubular conduit formed by tubes 16 and 17 is essentially continuous, having a tubular reagent entrance and a tubular by-product exit. The components, although not gas-tight, are fitted firmly to promote major passage of the reaction stream and to discourage residual vapor entrapment. In order to prevent clogging by condensed vapors of S, Te, Se, or As, the downstream conduit tube 17 is necessarily larger than the upstream conduit tube 16. Otherwise the condensed materials gather in hard lumps that gradually fill a portion of the downstream tube, causing build-up of pressure in the system and eventual leakage of vapors from the furnace.

Pyrolytic graphite is a preferred material for the reaction chamber. Pyrolytic graphite is superior to artificial graphite for containing raw material because it does not crumble from corrosion by reaction with the reactants, especially $H_2S$ and equivalents, at the high reaction temperatures especially near 1,300°C. Pyrolytic graphite is produced by a much different process than artificial graphite. In the production of the latter, coke particles are mixed with pitch, then extruded or molded to shape and baked through cycles which take the materials to nearly 3,000°C for weeks or longer. Pyrolytic graphite is produced by passing hydrocarbon gas over a hot graphite mandrel near 2,000°C. Carbon atoms are removed from the gas by thermal decomposition and are deposited in a manner similar to a vacuum plating process, the deposited platelets having a length of 100 to 500 A and a thickness of from 50 to 200 A. The resulting material of hexagonal crystal structure is of high density, very low porosity, is anisotropic in its elastic and transport properties, and is very pure.

Pyrolytic boron nitride is another material which is highly inert to the reactants of the process of the invention and is therefore a preferred material for the reaction chamber. Pyrolytic boron nitride is a material produced by vapor deposition by a gas-phase process at reduced pressures and at temperatures usually in excess of 1,890°C. It is usually deposited on a graphite mandrel so that the graphite cladding may be left on it to heat it when the graphite is induced in a reaction furnace generator. The crystalline structure of pyrolytic boron nitride is analagous to pyrolytic graphite, and the anisotropy in thermal and mechanical properties is similar, but it is an insulator. Outstanding properties include superior oxidation resistance below 1,962°C and excellent thermal shock resistance showing no deterioration on water quenching from 1,962°C.

While the thermal walls of the furnace can be heated electrically (resistance) or by radio frequency induction, the latter method is preferred because of the superior rate of heating and cooling allowing the process to proceed rapidly without long heating and cooling periods. In certain instances, as in the case of commercial production, the resistance heating might be more practical from a cost standpoint. Isothermal heating of the reaction chamber surface is most preferred for two reasons. It is important that all of the metal reactant be at the same temperature since portions at temperatures lower than the critical temperature will form oxy-impurities as discussed previously, and those portions of the metal reactant at temperatures higher than the critical temperature will experience "glazing" or "surface fusing" with a consequent reduction in surface area preventing the gas mixture reactant from reacting with a hard core. Isothermal heating is also preferred because it prevents by-products, such as water, from remaining in the reaction chamber which would interfere with the course of the reaction.

Referring to FIG. 2 illustrating a schematic reagent flowline, including the induction generator furnace of FIG. 1 in operation, 50 to 100 grams of metal oxide powder 15' or equivalent is placed into the pyrolytic graphite tube 15 and dispersed evenly. The neoprene stoppers 11 and 11' are positioned firmly in the ends of the quartz tube 10 and sealed with glyptal. Chemically pure grade argon, then $H_2S$ or equivalent is flushed through the line to remove air that might maintain a slight flammable or explosive mixture with the $H_2S$ or equivalent gas. High purity grade argon is then flushed through the stream, including bubbling through the chemically pure grade $CS_2$ or equivalent at 20. Flow is for 1 minute at ambient temperature.

The induction generator is started to effect inductive heating through the load coil 18 and critical reaction temperature is achieved in 5 to 10 minutes. Upon reaching the critical reaction temperature, the argon flow is stopped and $H_2S$ or equivalent from source 32 is flowed at a head of 2 psi through the $CS_2$ or equivalent at 20 at a rate which evaporates 50 ml. of $CS_2$ per hour and carries it downstream through a $P_2O_5$ drying bottle 19 and filter 21 to the reaction chamber 15.

Excess reagent vapors and by-product vapors from the reaction chamber are forced by the 2 psi pressure differential through the enlarged alumina conduit 17 to the chemical absorber at 22-23 of saturated NaOH solution. After about 1 hour of reagent flow, argon from source 31 is allowed to replace the reagent gas flow, the argon passing through the $P_2O_5$ drying bottle 33 and filter 34 before passing into reaction chamber 15. After 5 minutes of flowing dried argon at critical reaction temperature through the reaction chamber, the induction generator is shut off, and the argon is permitted to flow until the furnace reaches ambient temperature. Then the argon is shut off and the reacted powder is removed carefully.

Single crystals are grown from the metal sulfides, selenides, tellurides, and arsenides powders synthesized according to the process of the invention by employment of a modified Bridgman Crystal Growth Apparatus which is illustrated schematically in FIG. 3. Referring to FIG. 3, the apparatus consists of a pyrolytic graphite, pyrolytic boron nitride, or tungsten crucible 40 with a graphite lid 41 for holding the metal sulfide, telluride, selenide, or arsenide powder charge, indicated at 41'. The crucible 40 is encased in a quartz tube 42 having a water jacket 43 to prevent deterioration of the quartz tube 42. Rubber plugs 44 with central openings seal the open ends of the quartz tube 42. The central zone of the quartz tube 42 is surrounded by a specially wound coil 45 from a 15 kW Lepel induction generator to produce the desired temperature gradient. The crucible 40 is supported with the quartz tube 42 by means of an alumina pedestal 46 connected to an alundum tube 47 which passes through the central opening of the rubber plug 44 at the bottom of the quartz tube 42 and finally is connected with a mechanical screw type lowering device 47' which permits raising and lowering of the crucible 40 within the quartz tube 42 into and out of the induction heating zone 48 at a typical rate of three-eighths inch per hour. In the portion of the alundum tube 47 enclosed in the quartz tube 42 are openings 49 for the passage of gas into the quartz tube 42. A source of helium or argon, not shown, is connected to the lower portion of the alundum tube 47 for passage through the tube 47, as indicated at 49', into the quartz tube 42 through the openings 49 and exits from the top of the quartz tube 42 through an alundum tube 50 positioned in the central opening of the rubber plug 44 at the top of the quartz tube 42. A continuous flow of purified helium or argon is maintained within the quartz tube 42 to prevent contamination of the powder charge.

In forming the single crystals, the crucible is first charged with the metal sulfide, selenide, telluride, or arsenide powder and the crucible is raised to a point above the induction heating zone. After evacuation, e.g., to $10^{-5}$ mm Hg, helium is flowed into the quartz tube 42 and such flow is maintained for the duration of the process. Water is flowed through the water jacket 43 as needed to prevent melting of the quartz tube. Induction heating is begun in order to attain the desired temperature gradient which is then maintained for the duration of the process. The crucible 40 is then slowly lowered into the induction heating zone by means of the device 47' at a rate which permits as uniform melting as possible. The maximum temperature in the molten zone is slightly greater than the melting temperature of the charge. As the crucible 40 moves downwardly through the load coil 45, the melt crystallizes first at the tip 51 of the crucible to encourage and restrict growth to a single crystal.

Thus, the single crystals are formed by a controlled heating process, and because it is important to prevent reaction between the melt and the crucible wall, pyrolytic graphite, pyrolytic boron nitride, vapor deposited tungsten, or an equally inert material must be used for the crucible in which such controlled heating takes place.

The following specific examples are presented for the purpose of illustrating the invention and are not intended to be a limitation thereof.

EXAMPLE 1

*a*. Powder Preparation

Using the induction generator furnace described in FIG. 1 in a system of the type described generally in FIG. 2, 50 grams of dysprosium oxide is placed into the pyrolytic graphite tube 15 of the furnace and dispersed evenly. The neoprene stoppers 11 and 11' are positioned firmly in the ends of the quartz tube and sealed with glyptal. Chemically pure grade argon, then $H_2S$ is flushed through the line, as illustrated in FIG. 2. High purity grade argon is then flushed through the line including bubbling through the chemically pure grade $CS_2$ at 20. Flow is for 1 minute at ambient temperature. The induction generator is started so as to induce heating of the furnace to a temperature of 500°C over a period of 10 minutes. The purpose of this slow heating is to avoid sliding of the metal oxide charge caused by the outgassing of moisture. After the 10 minute outgassing period, the heating is increased rapidly to a temperature in the range of 1,275–1,300°C. Upon reaching the critical reaction temperature the argon flow is stopped and $H_2S$ is flowed at a head of 2 psi through the $CS_2$ at a rate which evaporates 50 ml. of $CS_2$ per hour and carries it downstream to the reaction chamber. This produces a flow of reaction gas consisting of about 2 percent $CS_2$ and 98 percent $H_2S$ through the furnace and into contact with the dysprosium oxide charge at 15' for the approximately 1 hour period of reaction. Excess reagent vapors and by-product vapors are forced from the reaction chamber by the 2 psi differential pressure through the enlarged alumina conduit 17 to the chemicaL absorber, saturated NaOH solution at 22-23.

After 1 hour of reagent flow, the argon is allowed to replace the reagent gas flow. After 5 minutes of flowing dry argon at critical reaction temperature, the induction generator is shut off, and the argon is permitted to flow until the furnace reaches ambient temperature. Then the argon is shut off and the $Dy_2S_3$ powder product is carefully removed from the furnace. The product is then soaked for 10 minutes in 200 ml. of hot spectographic-grade carbontetrachloride and at the end of this time, the soluble sulfur is removed by filtration.

b. Growth of Single Crystals

Single crystals of $Dy_2S_3$ are grown using the apparatus described in FIG. 3. The crucible is charged with about 25 grams of $Dy_2S_3$ produced as described above and the crucible is lowered into the heating zone at a temperature of 1,700°C, at a rate of 0.25 inch per hour, to effect growth of the single crystals.

The single crystals of $Dy_2S_3$ are about 0.25 inch in diameter and 1 inch long. Hot probe measurements reveal that the crystals are n-type conductors. Measurements of electrical resistivity yields constant values from 5°K to 800°C.

A single crystal of $Dy_2S_3$ was made which is 2 inches long and three-eighths inch in diameter. The diameter was necked down to about one-eighth inch at the center of the crystal at which point the crystal material was clear and transparent, and transmitted light between 5500 and 6000 Angstroms (yellow light). Electrical resistivity measurements of the clear center material showed it to be an insulator. The ends of the crystal were black in color and electrical resistivity showed the ends to be of n-type high conductivity. Thus, a junction was pulled between insulating $Dy_2S_3$ and semiconducting n-type $Dy_2S_3$.

EXAMPLE 2

The procedure of Example 1 is repeated except that 50 grams of neodymium acetate is substituted for the dysprosium oxide and the reaction temperature is 1,250°C. The $Nd_2S_3$ product amounts to about 56 grams.

Single crystals of $Nd_2S_3$ are grown following the procedure of Example 1. The crystals are dark grey in color with a bright metallic luster, are 0.25 inch in diameter and 1 inch long. Electrical resistivity measurements yield a value of about $10^{-2}$ ohm-cm., and hot probe measurements show the crystals to be n-type conductors. The melting point of the crystals is about 2,150°C.

EXAMPLE 3

The procedure of Example 1 is repeated except that 50 grams of gadolinium oxalate is substituted for the dysprosium oxide and the reaction temperature is 1,250°C. The $Gd_2S_3$ product amounts to about 27 grams.

Single crystals of $Gd_2S_3$ are grown following the procedure of Example 1. The crystals are dark grey in color with a bright metallic luster, are 0.25 inch in diameter and 1 inch long. Electrical resistivity measurements yield values of about $10^{-2}$ ohm-cm., and hot probe measurements show the crystals to be n-type conductors. The melting point of the crystals is about 1,900°C.

EXAMPLE 4

The procedure of Example 1 is repeated except that 50 grams of yttrium oxide is substituted for the dysprosium oxide. The reaction temperature is 1,250°C. The $Y_2S_3$ product amounts to about 60 grams.

Single crystals of $Y_2S_3$ are grown following the procedure of Example 1. The crystals are dark grey in color with a bright metallic luster, are 0.25 inch in diameter and 1.5 inches long. Electrical resistivity measurements yield a value of about $10^{-2}$ ohm-cm., and hot probe measurements show the crystals to be n-type conductors. The melting point of the crystals is about 1,700°C.

EXAMPLE 5

The procedure of Example 1 is repeated except that 50 grams of cerium oxide is substituted for the dysprosium oxide, and $H_2Te$ and $CTe_2$ are substituted for the $H_2S$ and $CS_2$, respectively. Traces of Te are removed with carbon disulfide solvent.

EXAMPLE 6

The procedure of Example 1 is repeated except that 50 grams of erbium carbonate is substituted for the dysprosium oxide, and $H_2Se$ and $CSe_2$ are substituted for the $H_2S$ and $CS_2$, respectively. Traces of Se in the product are removed with chloroform.

EXAMPLE 7

The procedure of Example 1 is repeated except that 50 grams of holmium oxide is substituted for the dysprosium oxide, and $H_2As$ and $CAs_2$ are substituted for the $H_2S$ and $CS_2$, respectively. Traces of As in the product are removed with carbon disulfide solvent.

EXAMPLE 8

The procedure of Example 1 is repeated except that 50 grams of samarium oxide is substituted for the dysprosium oxide.

EXAMPLE 9

The procedure of Example 1 is repeated except that 50 grams of europium acetate is substituted for the dysprosium oxide, and $H_2$ and diethyl sulfide are substituted for the $H_2$ and $CS_2$, respectively.

EXAMPLE 10

The procedure of Example 1 is repeated except that 50 grams of gallium oxide is substituted for the dysprosium oxide, and the reaction temperature is about 1,200° C.

EXAMPLE 11

The procedure of Example 1 is repeated except that aluminum oxide is substituted for the dysprosium oxide, and the reaction temperature is about 900°C.

EXAMPLE 12

The procedure of Example 1 is repeated except that lead oxide is substituted for the dysprosium oxide, and the reaction temperature is about 900° C.

It has also been found that the process of the invention can be carried out as a two-step procedure by contacting the anhydrous metal, metal salt, metal oxide or a mixture thereof first with (a) one of $CZ_2$ or an organic compound of Z, followed by contacting the reaction product with (b) one of the gases $H_2$ or $H_2Z$, as defined above. Thus, for example, an oxide such as dysprosium oxide can be sulfurated first by flowing $CS_2$ alone into contact with the oxide, followed by flowing $H_2S$ into contact with the dysprosium sulfide reaction product produced in the first step, to remove oxycarbide and metal oxide impurities from such reaction product.

The reaction temperatures for this two-step procedure are substantially the same as noted above, and approximately the same temperature is maintained for treatment in each of the two steps of the process. Time for reaction in the first step, e.g., initial sulfuration with $CS_2$ can be about 1 to about 4 hours, and the time for the second step treatment, e.g., with $H_2S$ can range from about 1 to about 4 hours.

However, this alternative procedure is not preferred, since such two step sequential process is slower and does not produce the superior results, e.g., from the standpoint of high purity product as compared to the preferred procedure employing a mixture of (a) and (b) above, e.g., a mixture of $CS_2$ and $H_2S$, for sulfuration by simultaneous treatment with these two gases.

An example of the above alternative two-step procedure is given below:

EXAMPLE 13

The procedure of Example 1 is repeated except that $CS_2$ and $H_2S$ are flowed separately through the reaction chamber over the 50 grams of $Dy_2O_3$. The $CS_2$ is first flowed through the reaction chamber by bubbling argon gas through the $CS_2$ liquid for a period of 2 hours followed by flow of $H_2S$ for a period of 2 hours through the reaction chamber. A temperature of 1275°–1325°C is maintained throughout the reaction and traces of S in the final product are removed with carbon tetrachloride as in Example 1. A pure powder is produced having properties comparable to the product of Example 1 but not quite as high purity.

Various modifications are contemplated and may be resorted to by those skilled in the art without departing from the spirit and scope of the invention, and hence the invention is not to be taken as limited except by the scope of the appended claims.

We claim:

1. A method for producing a sulfide, of a metal selected from the group consisting of Y, La, Ce, Pr, Nd, Pm, Sm, Eu, Gd, Tb, Dy, Ho, Er, Tm, Yb and Lu, comprising contacting a substance selected from the group consisting of substantially anhydrous metal, metal oxide, halide, sulfate, nitrate, carbonate, oxalate and acetate salt, and mixtures thereof, said metal being selected from the above said metal group, with a substantially dry gas mixture of $H_2S$ and $CS_2$, said gas mixture being in proportion of from about 10 percent to about 98 percent of $H_2S$ and from about 90 percent to about 2 percent of $CS_2$, said gas mixture being supplied to said metal reactant in excess over that required to react completely with said metal reactant, said reaction being conducted at a temperature in the range of from about 1,100°C to about 1,350°C and in the substantial absence of oxygen and water vapor, for a time sufficient to allow substantially complete reaction.

2. A method as defined in claim 1, wherein said substance is selected from the group consisting of the rare earth oxides of said metal.

3. A method as defined in claim 1, wherein said substance is an oxide of a rare earth metal selected from the group consisting of Nd, Sm, Gd, Dy and Y.

4. A method as defined in claim 2, wherein said gas mixture is in proportion of from about 50 to about 98 percent of $H_2S$ and from about 50 to about 2 percent of $CS_2$, said gas mixture being supplied to said metal reactant so that at least 100 moles (STP) of gas mixture flows over each mole of the metal reactant calculated as available cation, said reaction is conducted in a reaction chamber composed of a substance selected from the group consisting of pyrolytic graphite and pyrolytic boron nitride.

5. A method as defined in claim 1, wherein the reaction temperature is in the range of about 1,250° to about 1,325°C.

6. A method as defined in claim 1, wherein the $H_2S$ gas mixture is produced by bubbling gas into the liquid form of $CS_2$.

7. A method as defined in claim 1, wherein the reaction is conducted in a reaction chamber composed of a member selected from the group consisting of pyrolytic graphite and pyrolytic boron nitride.

8. A method as defined in claim 1, wherein the final product is first flushed with an inert gas and then washed with an inert solvent for sulfur.

9. A method as defined in claim 1, wherein said substance is an oxide of a rare earth metal selected from the group consisting of Nd, Sm, Gd, Dy and Y; said gas mixture is in proportion of from about 90 percent to about 98 percent of $H_2S$ and from about 10 percent to about 2 percent of $CS_2$; a substantial excess of the gas mixture is employed over that required to react completely with said metal reactant; and the reaction is conducted at a uniform temperature in the range of about 1,250° C to about 1,325° C.

* * * * *